US011444727B2

(12) United States Patent
Lei

(10) Patent No.: US 11,444,727 B2
(45) Date of Patent: Sep. 13, 2022

(54) METHOD AND APPARATUS FOR HARQ-ACK PAYLOAD REDUCTION FOR SEMI-STATIC HARQ-ACK CODEBOOK DETERMINATION

(71) Applicant: LENOVO (BEIJING) LIMITED, Beijing (CN)

(72) Inventor: Haipeng Lei, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 114 days.

(21) Appl. No.: 17/056,734

(22) PCT Filed: May 18, 2018

(86) PCT No.: PCT/CN2018/087538
§ 371 (c)(1),
(2) Date: Nov. 18, 2020

(87) PCT Pub. No.: WO2019/218357
PCT Pub. Date: Nov. 21, 2019

(65) Prior Publication Data
US 2021/0203451 A1 Jul. 1, 2021

(51) Int. Cl.
*H04L 1/18* (2006.01)
*H04W 72/04* (2009.01)
(52) U.S. Cl.
CPC .......... *H04L 1/1819* (2013.01); *H04L 1/1896* (2013.01); *H04W 72/042* (2013.01); *H04W 72/0446* (2013.01)
(58) Field of Classification Search
CPC .. H04L 1/1819; H04L 1/1896; H04W 72/042; H04W 72/0446
See application file for complete search history.

(56) References Cited

U.S. PATENT DOCUMENTS

2017/0134140 A1\* 5/2017 Park ...................... H04L 1/1812
2017/0280430 A1\* 9/2017 Yin ....................... H04W 76/18
(Continued)

FOREIGN PATENT DOCUMENTS

CN 107113122 A 8/2017
WO 2017193390 A1 11/2017

OTHER PUBLICATIONS

Lenovo, Motorola Mobility, "Remaining issues for CA with different numerologies", R1-1806344, 3GPP TSG RAN WG1 Meeting #93, May 21-25, 2018, pp. 1-5.
(Continued)

*Primary Examiner* — Jael M Ulysse
(74) *Attorney, Agent, or Firm* — Kunzler Bean & Adamson

(57) ABSTRACT

The present application relates to method and apparatus for downlink slot set determination. One embodiment of the present disclosure provides an apparatus comprising: a receiver that receives a first number of downlink transmissions indicating a first slot for transmitting corresponding HARQ-ACK feedback and receives a second number of downlink transmissions indicating a second slot for transmitting corresponding HARQ-ACK feedback; a processor that determines a first downlink slot set for the HARQ-ACK feedback transmitted in the first slot and a second downlink slot set for the HARQ-ACK feedback transmitted in the second slot, and determines the first downlink slot set and the second downlink slot set have at least one overlapped slot; and a transmitter that transmits a first HARQ-ACK codebook in the first slot for the first downlink slot set and a second HARQ-ACK codebook in the second slot for the second downlink slot set, wherein HARQ-ACK feedback for each of the at least one overlapped slot is included in
(Continued)

either the first HARQ-ACK codebook or the second HARQ-ACK codebook.

20 Claims, 10 Drawing Sheets

(56) References Cited

U.S. PATENT DOCUMENTS

| | | | | |
|---|---|---|---|---|
| 2017/0366305 | A1* | 12/2017 | Hwang | H04L 5/001 |
| 2018/0102892 | A1* | 4/2018 | Lunttila | H04L 1/1822 |
| 2018/0132264 | A1* | 5/2018 | Jung | H04L 1/1864 |
| 2018/0323939 | A1* | 11/2018 | Nory | H04L 1/1861 |
| 2019/0268803 | A1* | 8/2019 | He | H04L 1/1816 |
| 2021/0152295 | A1* | 5/2021 | Falconetti | H04L 5/0055 |

OTHER PUBLICATIONS

PCT/CN2018/087538, "International Search Report and the Written Opinion of the International Search Authority" ISA/CN, State Intellectual Property Office of the P.R. China, Feb. 12, 2019, pp. 1-7.

* cited by examiner

METHOD AND APPARATUS FOR HARQ-ACK PAYLOAD REDUCTION FOR SEMI-STATIC HARQ-ACK CODEBOOK DETERMINATION

TECHNICAL FIELD

The present application generally relates to 3GPP 5G new radio (NR) especially for Hybrid Automatic Repeat Request-Acknowledgement (HARQ-ACK) transmission for NR downlink data transmission.

BACKGROUND OF THE INVENTION

In wireless communication technology, HARQ-ACK feedback technology is commonly used during data transmission, so as to feedback whether data was correctly received in a downlink (DL) or uplink (UL) transmission. HARQ-ACK represents collectively the Positive Acknowledgement (ACK) and the Negative Acknowledgement (NACK). ACK means a data unit is correctly received while NACK means a data unit is erroneously received or missing. The HARQ-ACK feedback bits corresponding to Physical Downlink Shared Channel (PDSCH) are transmitted either on the Physical Uplink Control Channel (PUCCH) or on the Physical Uplink Shared Channel (PUSCH). HARQ-ACK feedback for multiple PDSCHs can be multiplexed in one HARQ-ACK codebook by means of HARQ-ACK multiplexing.

The Downlink (DL) transport blocks (TBs) are carried on the PDSCH in 3GPP LTE Release 8 and onwards. A maximum of two TBs can be transmitted in one PDSCH in one serving cell and in one subframe.

In NR, besides of TB-based retransmission, code block group (CBG) based retransmission is also introduced. For TB-based retransmission, one HARQ-ACK feedback bit corresponds to one TB. As long as one code block (CB) of a given TB is not correctly decoded at receiver side, the whole TB will be reported to a "NACK". Thus, the transmitter has to retransmit all CBs of the TB. In case one HARQ-ACK feedback bit corresponds to one CB, the gNB can know decoding state of each transmitted CB and only retransmit the failed CBs. In this way, retransmission efficiency is the highest. However, the HARQ-ACK feedback overhead may be huge.

In order to balance the number of the needed HARQ-ACK feedback bits and the retransmission efficiency, the concept of CBG is introduced in RAN1 (Radio Access Network). Basically, the intention of CBG is to group several code blocks into one code block group and the resulting HARQ-ACK feedback is generated per CBG. Only all the code blocks within one CBG are correctly decoded the HARQ-ACK for the CBG can be set to "ACK"; otherwise, it is set to "NACK.". Upon the reception of the HARQ-ACK feedback, only the CBG(s) with "NACK" shall be retransmitted by the transmitter.

For CBG-based retransmission; RRC (Radio Resource Control) signaling is used to configure the maximum number of CBGs per TB. So both semi-static HARQ-ACK codebook and dynamic HARQ-ACK codebook, the number of HARQ-ACK bits for one TB is equal to the configured maximum number of CBGs per TB, regardless of the variable TBS of a given TB.

BRIEF SUMMARY OF THE INVENTION

One embodiment of the present disclosure provides an apparatus comprising: a receiver that receives a first number of downlink transmissions indicating a first slot for transmitting corresponding HARQ-ACK feedback and receives a second number of downlink transmissions indicating a second slot for transmitting corresponding HARQ-ACK feedback; a processor that determines a first downlink slot set for the HARQ-ACK feedback transmitted in the first slot and a second downlink slot set for the HARQ-ACK feedback transmitted in the second slot, and determines the first downlink slot set and the second downlink slot set have at least one overlapped slot; and a transmitter that transmits a first HARQ-ACK codebook in the first slot for the first downlink slot set and a second HARQ-ACK codebook in the second slot for the second downlink slot set, wherein HARQ-ACK feedback for each of the at least one overlapped slot is included in either the first HARQ-ACK codebook or the second HARQ-ACK codebook.

Another embodiment of the present disclosure provides an apparatus comprising: a transmitter that transmits a first number of downlink transmissions indicating a first slot for transmitting corresponding HARQ-ACK feedback and transmits a second number of downlink transmissions indicating a second slot for transmitting corresponding HARQ-ACK feedback; a processor that determines a first downlink slot set for the HARQ-ACK feedback transmitted in the first slot and a second downlink slot set for the HARQ-ACK feedback transmitted in the second slot; and determines the first downlink slot set and the second downlink slot set have at least one overlapped slot; and a receiver that receives a first HARQ-ACK codebook in the first slot for the first downlink slot set and a second HARQ-ACK codebook in the second slot for the second downlink slot set, wherein HARQ-ACK feedback for each of the at least one overlapped slot is included in either the first HARQ-ACK codebook or the second HARQ-ACK codebook.

Yet another embodiment of the present disclosure provides a method comprising: receiving a first number of downlink transmissions indicating a first slot for transmitting corresponding HARQ-ACK feedback and a second number of downlink transmissions indicating a second slot for transmitting corresponding HARQ-ACK feedback; determining a first downlink slot set for the HARQ-ACK feedback transmitted in the first slot and a second downlink slot set for the HARQ-ACK feedback transmitted in the second slot; determining the first downlink slot set and the second downlink slot set have at least one overlapped slot; and transmitting a first HARQ-ACK codebook in the first slot for the first downlink slot set and a second HARQ-ACK codebook in the second slot for the second downlink slot set, wherein HARQ-ACK feedback for each of the at least one overlapped slot is included in either the first HARQ-ACK codebook or the second HARQ-ACK codebook.

Yet another embodiment of the present disclosure provides a method comprising: transmitting a first number of downlink transmissions indicating a first slot for transmitting corresponding HARQ-ACK feedback and transmits a second number of downlink transmissions indicating a second slot for transmitting corresponding HARQ-ACK feedback; determines a first downlink slot set for the HARQ-ACK feedback transmitted in the first slot and a second downlink slot set for the HARQ-ACK feedback transmitted in the second slot; determining the first downlink slot set and the second downlink slot set have at least one overlapped slot; and receiving a first HARQ-ACK codebook in the first slot for the first downlink slot set and a second HARQ-ACK codebook in the second slot for the second downlink slot set, wherein HARQ-ACK feedback for each of the at least one overlapped slot is included in either the first HARQ-ACK codebook or the second HARQ-ACK codebook.

Traditionally, the semi-static HARQ-ACK feedback for an overlapped slot, which is within both the first downlink slot set and the second downlink slot set, is included in both of the first HARQ-ACK codebook and the second HARQ-ACK codebook, That is, the HARQ-ACK feedback for an overlapped slot is transmitted twice. According to the subject inventions, the HARQ-ACK feedback for an overlapped slot is included in either the first HARQ-ACK codebook or the second HARQ-ACK codebook, such that the HARQ-ACK feedback overhead is reduced.

DETAILED DESCRIPTION OF THE INVENTION

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

Embodiments provide the method and apparatus for semi-statically configured HARQ-ACK feedback information. To facilitate understanding, embodiments are provided under specific network architecture and new service scenarios, such as 3GPP 5G, 3GPP LTE Release 8 and onwards. Persons skilled in the art know well that, with developments of network architecture and new service scenarios, the embodiments in the subject disclosure are also applicable to similar technical problems.

Figure 1:
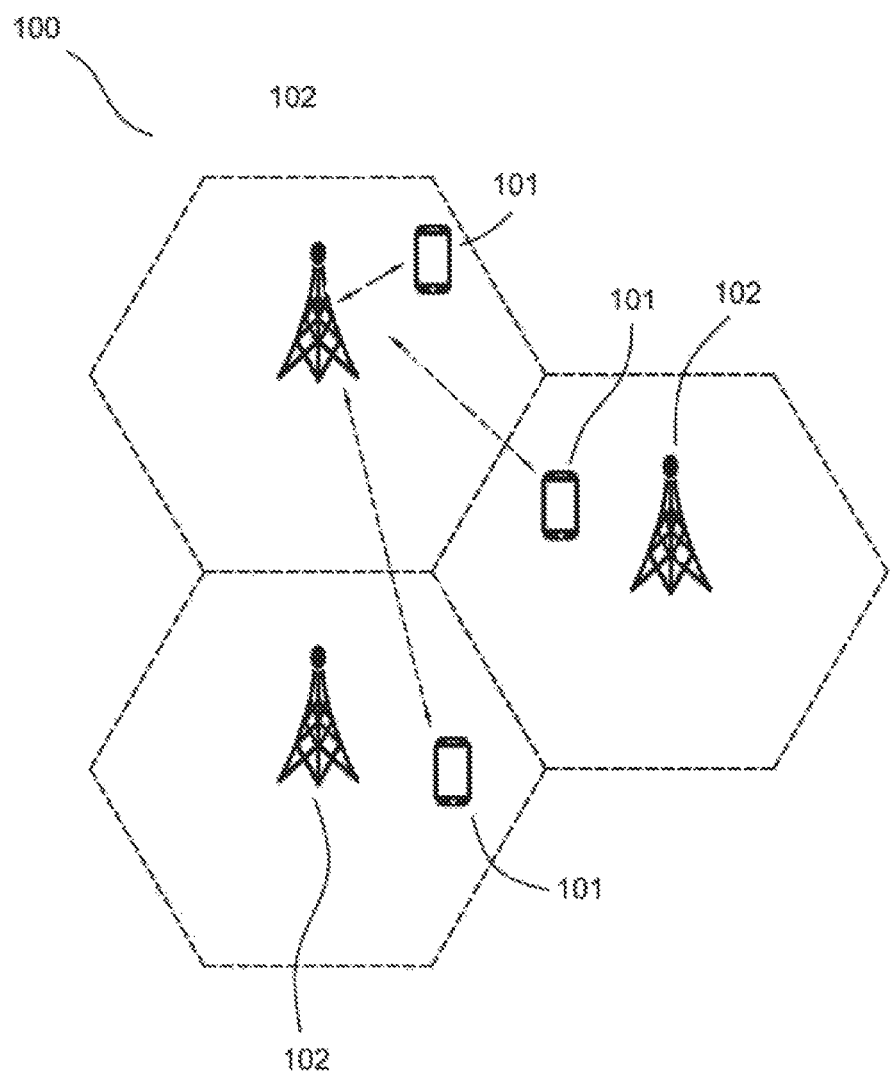
FIG. 1 illustrates an example block diagram of a wireless communication system according to an embodiment of the present disclosure.

FIG. 1 depicts a wireless communication system 100 according to an embodiment of the present disclosure.

As shown in FIG. 1, the wireless communication system 100 includes remote units 101 and base units 102. Even though a specific number of remote units 101 and base units 102 are depicted in FIG. 1, one of skill in the art will recognize that any number of remote units 101 and base units 102 may be included in the wireless communication system 100.

The remote units 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices routers, switches, modems), or the like. According to an embodiment of the present disclosure, the remote units 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the remote units 101 include wearable devices, such as smart watches, fitness bands, optical head-mounted displays, or the like. Moreover, the remote units 101 may be referred to as subscriber units, mobiles, mobile stations, users, terminals, mobile terminals, wireless terminals, fixed terminals, subscriber stations, remote units 101, user terminals, a device, or by other terminology used in the art. The remote units 101 may communicate directly with a base unit 102 via UL communication signals.

The base units 102 may be distributed over a geographic region. In certain embodiments, a base unit 102 may also be referred to as an access point, an access terminal, a base, a base station, a macro cell, a Node-B, an enhanced Node B (eNB), a base units 102, a Home Node-B, a relay node, a device, or by any other terminology used in the art. The base units 102 are generally part of a radio access network that may include one or more controllers communicably coupled to one or more corresponding base units 102.

The wireless communication system 100 is compliant with any type of network that is capable of sending and receiving wireless communication signals. For example, the wireless communication system 100 is compliant with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, 3GPP 5G network, a satellite communications network, a high altitude platform network, and/or other communications networks.

In one implementation, the wireless communication system 100 is compliant with the long-term evolution (LTE) of the 3GPP protocol, wherein the base unit 102 transmits using an orthogonal frequency division multiplexing (OFDM) modulation scheme on the DL and the remote units 101 transmit on the UL using a single-carrier frequency division multiple access (SC-FDMA) scheme or OFDM scheme. More generally, however, the wireless communication system 100 may implement some other open or proprietary communication protocol, for example, WiMAX, among other protocols.

In other embodiments, the base unit 102 may communicate using other communication protocols, such as the IEEE 802.11 family of wireless communication protocols. Further, in some embodiments the base unit 102 may communicate over licensed spectrum, while in other embodiments the base unit 102 may communicate over unlicensed spectrum. The present disclosure is not intended to be limited to the implementation of any particular wireless communication system architecture or protocol. In another embodiment, the base unit 102 may communicate with remote units 101 using the 3GPP 5G protocols.

Figure 2:
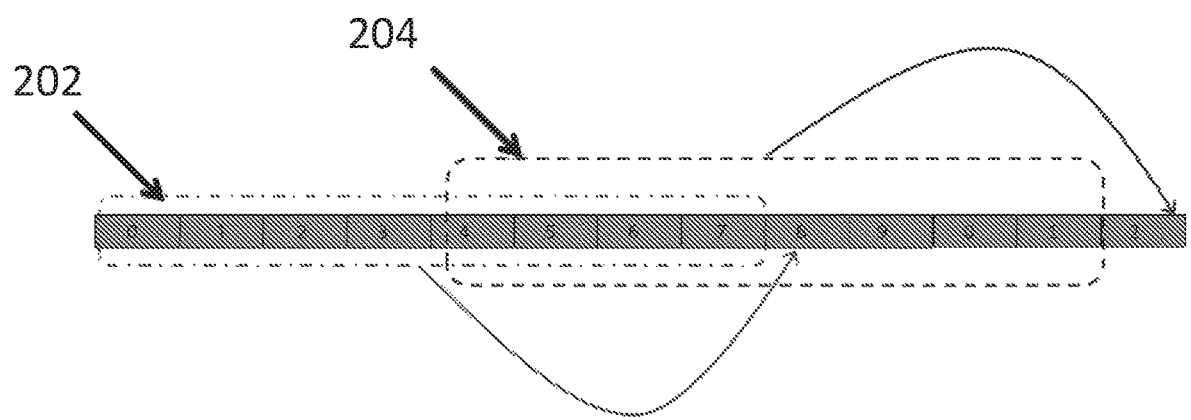
FIG. 2 illustrates an example of downlink slots for multiple downlink association sets.

FIG. 2 illustrates an example of downlink slots for multiple downlink association sets.

In current TS38.213, semi-static HARQ-ACK codebook size determination is named Type 1 HARQ-ACK codebook determination and dynamic HARQ-ACK codebook size determination is named Type 2 HARQ-ACK codebook determination. Although semi-static HARQ-ACK codebook leads to large overhead, it can guarantee the base station and UE have same knowledge on the HARQ-ACK codebook size.

For semi-static HARQ-ACK codebook determination, within a given DL association set, candidate PDSCH occasions are determined based on below factors:
  the HARQ-ACK feedback timing set (e.g., set of K1),
  PDSCH symbol allocation table in time domain,
  Semi-static UL/DL (uplink/downlink) configuration.

As a result, semi-static HARQ-ACK codebook is determined based on the following factors:
  Number of valid slots within each downlink association set,
    Any slot with at least one symbol configured as UL by semi-static UL/DL configuration, which is excluded from the downlink association set.
  Number of TBs for one PDSCH,
  Number of configured DL carriers,
  Maximum number of non-overlapped PDSCH occasions per slot per cell,
    If the LIE is capable of receiving more than one unicast PDSCH per slot, the maximum number of non-overlapped unicast PDSCH occasions per slot is determined by Start and Length Indicator Value (SLIV) in the configured pdsch-symbolAllocation table.
    Otherwise, the LIE is expected to receive only one unicast PDSCH per slot, and HARQ-ACK association set assumes one unicast PDSCH occasion per slot.
  Max number of CBGs per TB.

In view of the above, it is aware that semi-static HARQ-ACK codebook determination leads to a relatively large HARQ-ACK codebook. In some cases, the HARQ-ACK codebook may be huge. Therefore, HARQ-ACK payload reduction for semi-static HARQ-ACK codebook determination is necessary.

For semi-static HARQ-ACK codebook determination, the values in the HARQ-ACK feedback timing set, K1 set, is configured by Radio Resource Control (RRC) signalling. According to the subject invention, up to 8 values can be configured in K1 set. HARQ-ACK timing is indicated by a base unit with three bits in PDSCH-to-HARQ_feedback timing field in DCI (Downlink Control Information) format 1_0 or DCI format 1_1. The three bits dynamically indicate the values in K1 set. Thus, an UE may determine the HARQ-ACK timing with the three bits in DCI. If more than one value is configured in the K1 set, DL association set for multiple HARQ-ACK codebooks may overlap.

One example of overlapped slots for multiple downlink association sets is shown in FIG. 2. Assuming the HARQ-ACK feedback timing set, i.e., K1 set={1, 2, 3, 4, 5, 6, 7, 8}, for HARQ-ACK codebook reported in slot n, the corresponding downlink association set includes slot n−1, n−2, . . . , n−8. In more details, when the base station schedules PDSCH(s) to UE by DCI format and indicates UE to transmit HARQ-ACK feedback in slot 8, the corresponding downlink slot set 202 includes slot 0, 1, . . . , 7; when the base station further schedules PDSCH(s) to UE by DCI format and indicates UE to transmit HARQ-ACK feedback in slot 2, the corresponding downlink association set 204 includes slot 4, 5, . . . , 9, 0 and 1. Consequently, there are four slots overlapped in the downlink slot sets 202 and 204, i.e., slots 4, 5, 6 and 7. Without any solution, HARQ-ACK feedback for slot 4, 5, 6 and 7 is unnecessarily reported at least twice.

More generally, if the base station schedules PDSCH(s) to UE by DCI format and indicates LIE to transmit HARQ-ACK feedback in slot $S_1$, the corresponding downlink slot set includes slot $S_1-1$, $S_1-2$, . . . , $S_1-8$; and if the base station further schedules PDSCH(s) to UE by DCI format and indicates UE to transmit HARQ-ACK feedback in slot $S_2$, the corresponding downlink slot set includes slot $S_2-1$, $S_2-2$, . . . , $S_2-8$. Assuming $S_2>S_1$, the offset between the two slots is $S_2-S_1$. If the offset between the first slot and the second slot is less than the size of the HARQ-ACK feedback timing set, there would be overlap slots in the two downlink slot sets, and the number of the overlapped slots equal to the size of K1 set—$(S_2-S_1)$, namely, the size of the HARQ-ACK feedback timing set minus the slot offset between the first slot and the second slot.

Especially, in consideration of multiple carriers, multiple codewords per TB, multiple non-overlapped unicast PDSCH receptions per slot as well as CBG-based retransmission in a DL association set, the redundant HARQ-ACK feedback overhead are huge.

The subject invention intends to reduce HARQ-ACK feedback for overlapped slots between multiple downlink association sets when semi-static HARQ-ACK codebook determination is applied.

According to the subject invention, several embodiments are proposed for semi-static HARQ-ACK codebook determination so that the UE can reduce redundant HARQ-ACK payload and synchronize the HARQ-ACK codebook size between the base unit and remote unit.

Figure 3:
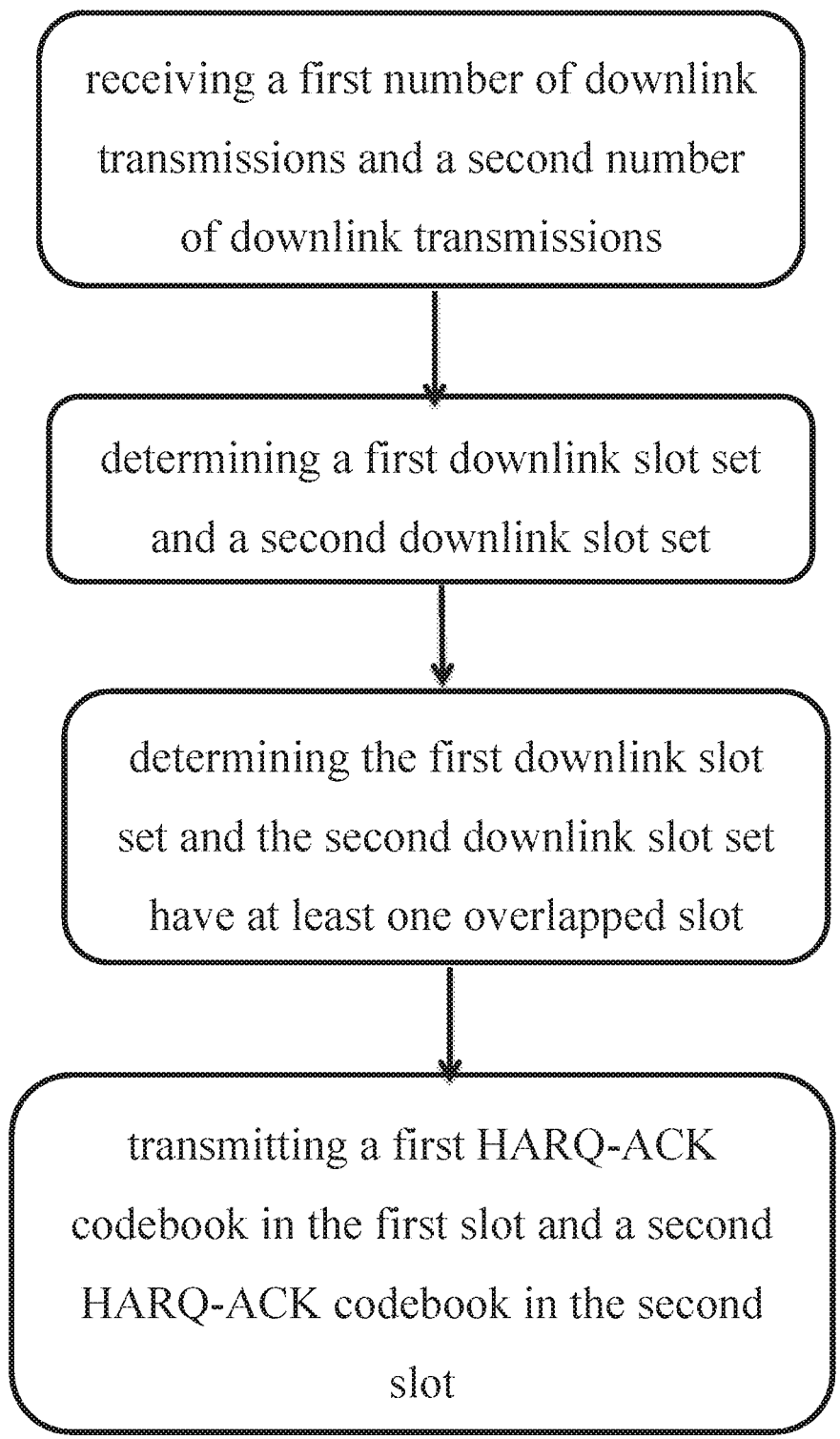
FIG. 3 illustrates a flowchart of a method according to an embodiment of the present disclosure.

FIG. 3 shows a method for HARQ-ACK payload reduction for semi-static HARQ-ACK codebook performed by a remote unit. In the following paragraphs, the downlink transmissions of FIG. 2 are taken as an example to explain the method of FIG. 3.

The method of FIG. 3 includes receiving a number of downlink transmissions, which indicates a slot for transmitting corresponding HARQ-ACK feedback (e.g., slot 8), receiving another number of downlink transmissions, which indicates a slot for transmitting corresponding HARQ-ACK feedback (e.g., slot 2). The method further includes determining downlink slot set 202 for the HARQ-ACK feedback transmitted in slot 8, and determining downlink slot set 204 for the HARQ-ACK feedback transmitted in slot 2. The downlink slot set (202 or 204) is determined based on the indicated slot (slot 8 or slot 2) and the size of K1 set. According to the present disclosure, the downlink slot set is K1 slots (e.g., slots 0, 1 . . . 7) preceding the indicated slot (e.g., slot 8).

The method further includes determining whether the downlink slot sets 202 and 204 have overlapped slots. In FIG. 2, Slots 4, 5, 6 and 7 are overlapped slots. The method further includes transmitting HARQ-ACK codebook for downlink slot set 202 in slot 8 and HARQ-ACK codebook for downlink slot set 204 in slot 2. According to the subject invention, for each of the overlapped slots 4, 5, 6 and 7, the HARQ-ACK feedback thereof is transmitted in either slot 8 or slot 2. In other word, HARQ-ACK feedback for each of the overlapped slots is included in either the first HARQ-ACK codebook or the second HARQ-ACK codebook. The mechanism of determining in which HARQ-ACK codebook the HARQ-ACK feedback of an overlapped slot is included will be explained later.

Figure 4:
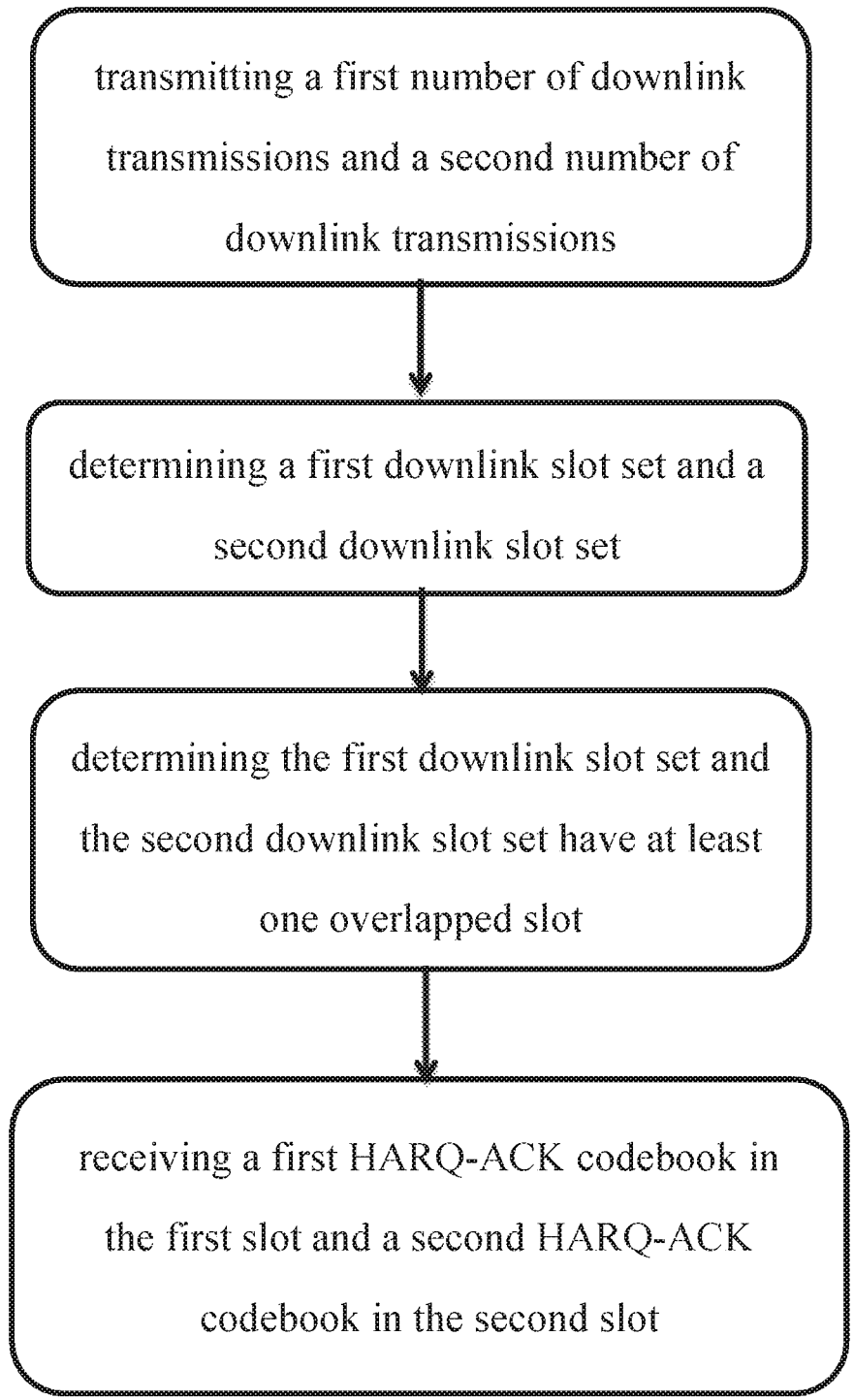
FIG. 4 illustrates a flowchart of a method according to an embodiment of the present disclosure.

FIG. 4 shows a method for HARQ-ACK payload reduction for semi-static HARQ-ACK codebook performed by a base unit. In the following paragraphs, the downlink transmissions of FIG. 2 are taken as an example, so as to explain the method of FIG. 4.

The method of FIG. 4 includes transmitting downlink transmissions, which indicate a slot (e.g., slot 8) for transmitting corresponding HARQ-ACK feedback; and transmitting downlink transmissions, which indicate a slot (e.g. slot 2) for transmitting corresponding HARQ-ACK feedback. The method further includes determining a downlink slot set 202 and a downlink slot set 204 and determining whether the downlink slot sets 202 and 204 have overlapped slots The method further includes receiving HARQ-ACK codebook in slot 8 for downlink slot set 202 and a HARQ-ACK codebook in slot 2 for the downlink slot set 204.

According to the subject invention, for each of the overlapped slots 4, 5, 6 and 7, the HARQ-ACK feedback thereof is included in either slot 8 or slot 2. In other word, HARQ-ACK feedback for each of the overlapped slot is included in either the first HARQ-ACK codebook or the second HARQ-ACK codebook. The mechanism of determining in which HARQ-ACK codebook the HARQ-ACK feedback of an overlapped slot is included will be explained later.

Please be advised that the above embodiment use the downlink transmissions of FIG. 4 as an example. According to the present disclosure, the slots for transmitting HARQ-ACK codebooks and the K1 set may vary in different situation.

Figure 5:
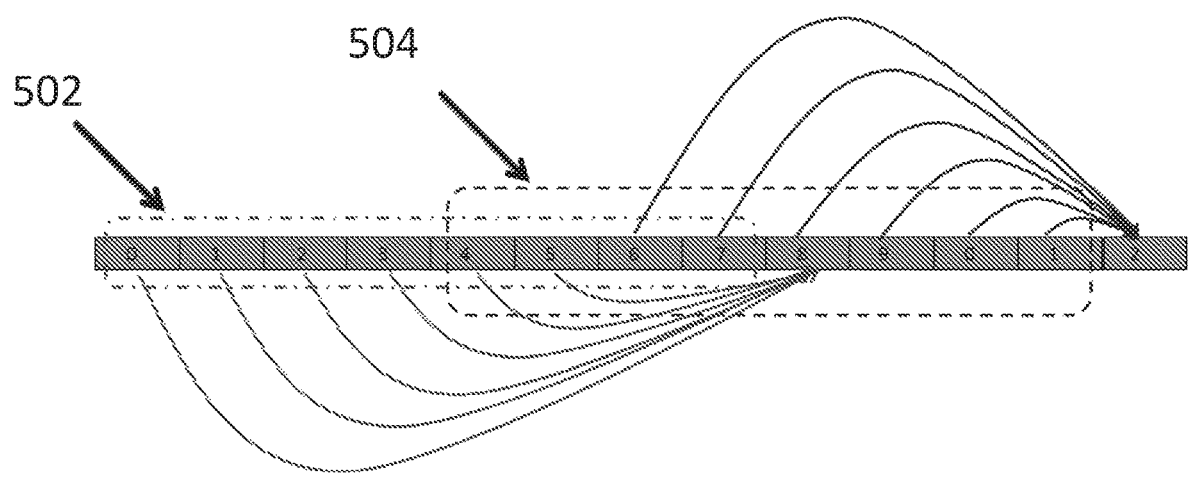
FIG. 5 illustrates an example of dividing the overlapped slots.

FIG. 5 shows an embodiment of the mechanism of determining in which HARQ-ACK codebook the feedback of an overlapped slot is included according to the subject invention. In the embodiment of FIG. 5, a first semi-static HARQ-ACK codebook for downlink slot set 502 is transmitted in slot 8, semi-static HARQ-ACK codebook for downlink slot set 504 is transmitted in slot 2, and the overlapped slots are slot 4, 5, 6, and 7.

In the present embodiment, the four overlapped slots are divided into two portions of slots, in this example, the first portion is slot 4 and slot 5, and the second portion is slot 6 and slot 7. Other division manners are also feasible in other embodiments, for example, slot 4 and slots 5-7. As show in FIG. 5, slot 4 and slot 5 are only included in the semi-static HARQ-ACK codebook in slot 8 and slot 6 and slot 7 are only included in the semi-static HARQ-ACK codebook in slot 2. That is, the HARQ-ACK feedback for each of the overlapped slots is included either in the first semi-static HARQ-ACK codebook, or in the second semi-static HARQ-ACK codebook, Thus, the semi-static HARQ-ACK codebook in slot 8 includes HARQ-ACK feedback for slot 0, 1, 2, 3, 4, and 5 and the semi-static HARQ-ACK codebook in slot 2 includes HARQ-ACK feedback for slot 6, 7, 8, 9, 0, and 1.

Since the overlapped slots are determined based on the semi-statically configured K1 set, there is no ambiguity between the base unit and remote unit on the respective downlink association set.

Figure 6:
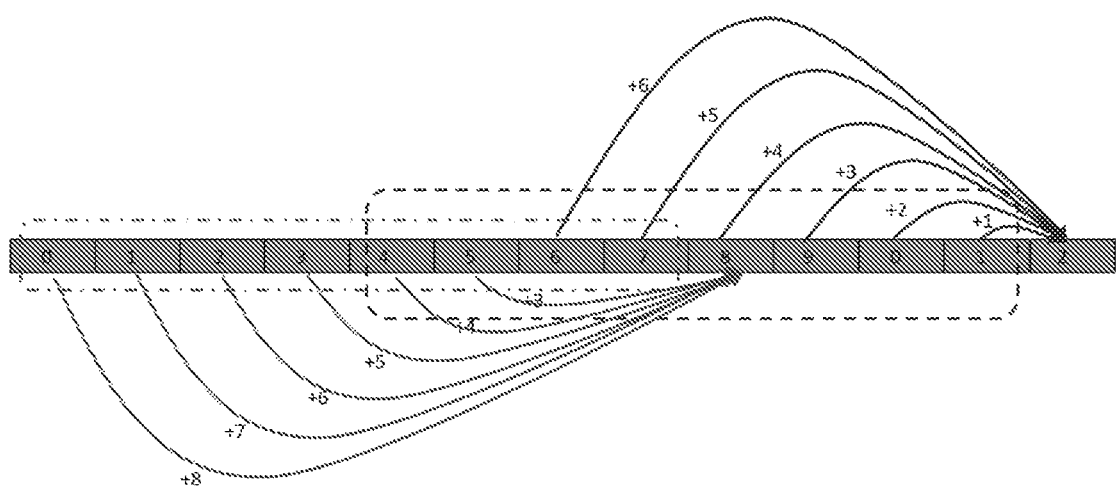
FIG. 6 illustrates another example of dividing the overlapped slots.

FIG. 6 shows another embodiment of the mechanism of determining in which HARQ-ACK codebook the feedback of an overlapped slot is included according to the subject invention. In this embodiment, the base unit transmits unicast PDSCH or PDCCH for indicating SPS release in the slot. The HARQ-ACK timing for each slot is dynamically indicated in associated DCI. The "+x" in FIG. 6 means the timing offset between PDSCH and corresponding HARQ-ACK feedback.

For example, the HARQ-ACK timing in associated DCI of slot 0 is "±8," which indicates that the HARQ-ACK feedback for slot 0 will be transmitted in slot 0+8 (e.g., slot 8). Similarly, the HARQ-ACK timing in associated DCI of slot 1 is "+7," which indicates that the HARQ-ACK feedback for slot 1 will be transmitted in slot 1±7 (e.g., slot 8). Thus, in FIG. 6, the HARQ-ACK feedback of slots 0, 1, 2, 3, 4, and 5 will be transmitted in slot 8, and the HARQ-ACK feedback of slots 6, 7, 8, 9, 0, and 1 will be transmitted in slot 2

Figure 7:
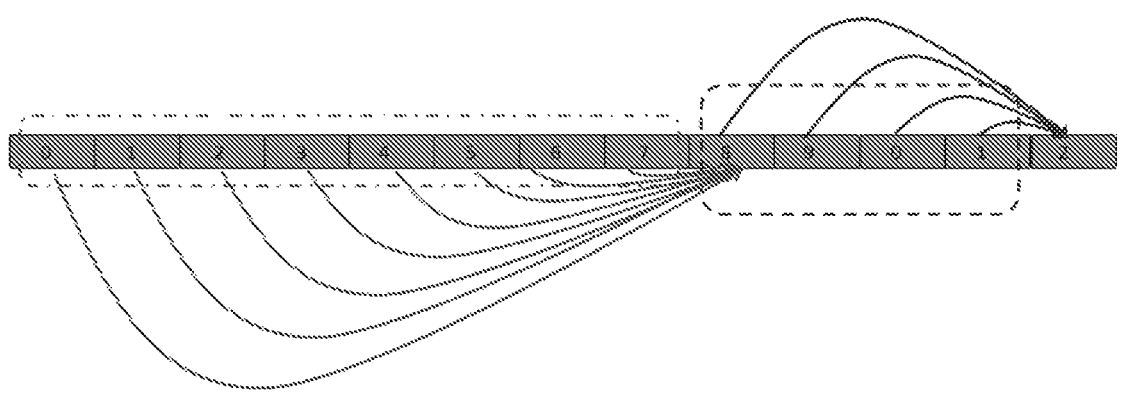
FIG. 7 illustrates an example of including all the overlapped slots in the first HARQ-ACK codebook.

FIG. 7 shows another embodiment of the mechanism of determining in which HARQ-ACK codebook the feedback of an overlapped slot is included according to the subject invention.

The example of downlink transmissions in the above embodiment is again adopted in this embodiment. That is, the overlapped slots are slot 4, 5, 6, and 7. In this embodiment, the four overlapped slots are all included in the first semi-static HARQ-ACK codebook. Thus, the first semi-static HARQ-ACK codebook includes HARQ-ACK feedback of slot 0, 1, 2, 3, 4, 5, 6 and 7 and the second semi-static HARQ-ACK codebook includes HARQ-ACK feedback of slot 8, 9, 0, and 1.

In other words, the overlapped slots are only included in the downlink slot set for the first semi-static HARQ-ACK codebook, and are excluded from the downlink slot set for the second semi-static HARQ-ACK codebook.

One benefit of this embodiment is the second semi-static HARQ-ACK codebook can be easier to use fallback PUCCH due to the reduced downlink association set.

Figure 8:
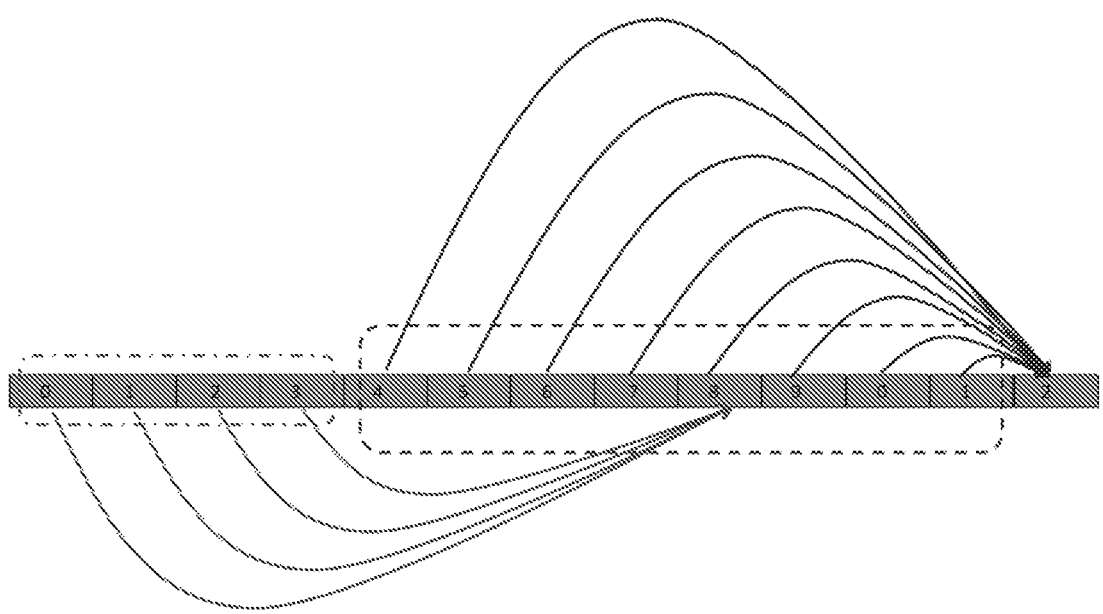
FIG. 8 illustrates an example of including all the overlapped slots in the second HARQ-ACK codebook.

FIG. 8 shows another embodiment of the mechanism of determining in which HARQ-ACK codebook the feedback of an overlapped slot is included according to the subject invention.

The example of downlink transmissions in the above embodiment is again adopted in this embodiment. That is, the overlapped slots are slot 4, 5, 6, and 7. In this embodiment, the four overlapped slots are included only in the second semi-static HARQ-ACK codebook. Thus, the first semi-static HARQ-ACK codebook includes HARQ-ACK feedback of slot 0, 1, 2 and 3 and the second semi-static HARQ-ACK codebook includes HARQ-ACK feedback of slot 4, 5, 6, 7, 8, 9, 0, and 1.

In other words, the overlapped slots are only included in the downlink slot set for the second semi-static HARQ-ACK codebook, and are excluded from the downlink association set for the first semi-static HARQ-ACK codebook.

One benefit of this alternative is the first semi-static HARQ-ACK codebook can be easier to use fallback PUCCH due to the reduced downlink association set.

Figure 9:
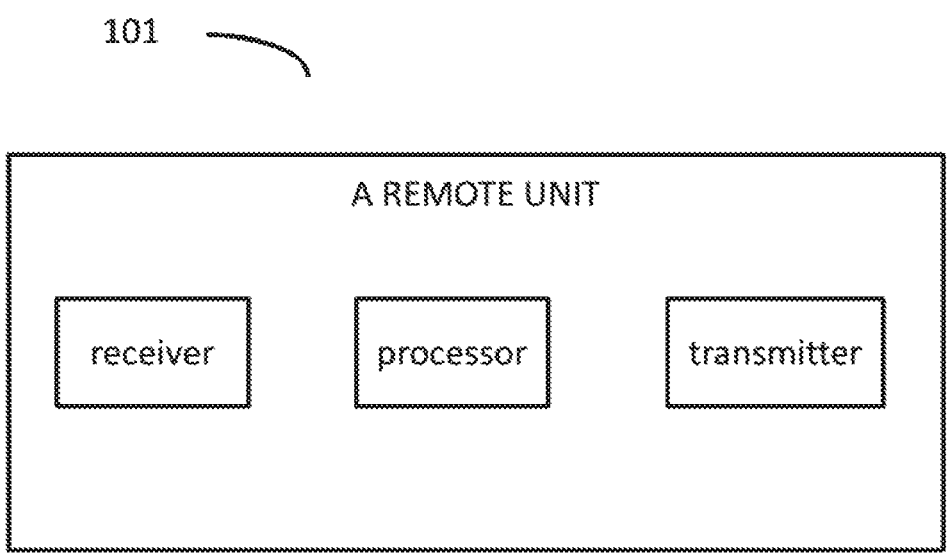
FIG. 9 illustrates an example block diagram of a remote unit according to an embodiment of the present disclosure.

FIG. 9 depicts an remote unit according to the embodiments of the present disclosure. The remote unit 101 may include a receiver, a processor, and a transmitter. In some embodiments, the receiver and the transmitter are combined into a single device, such as a transceiver. In certain embodiments, the remote unit 101 may further include an input device, a display, a memory, and/or other elements. In one embodiment, the receiver receives a first number of downlink transmissions indicating a first slot for transmitting corresponding HARQ-ACK feedback and receives a second number of downlink transmissions indicating a second slot for transmitting corresponding HARQ-ACK feedback. The processor determines a first downlink slot set for the HARQ-ACK feedback transmitted in the first slot and a second downlink slot set for the HARQ-ACK feedback transmitted in the second slot, and determines the first downlink slot set and the second downlink slot set have at least one overlapped slot. The transmitter transmits a first HARQ-ACK codebook in the first slot for the first downlink slot set and a second HARQ-ACK codebook in the second slot for the second downlink slot set. According to the present invention HARQ-ACK feedback for each of the at least one overlapped slot is included in either the first HARQ-ACK codebook or the second HARQ-ACK codebook. The functions and implementations of all elements in the apparatus and definitions of related technical terms can refer to the specific descriptions of FIGS. 3-8 and the foregoing corresponding paragraphs in this specification.

Figure 10:
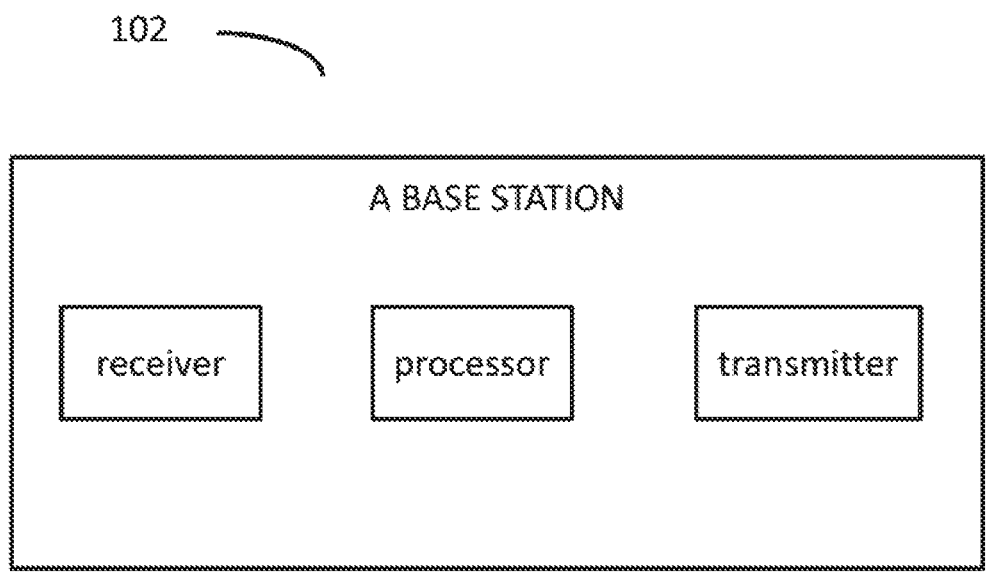
FIG. 10 illustrates an example block diagram of a base unit according to an embodiment of the present disclosure.

FIG. 10 depicts a base unit according to the embodiments of the present disclosure. The base unit 102 may include a transmitter, a processor, and a receiver. In some embodiments, the transmitter and the receiver are combined into a single device, such as a transceiver. In certain embodiments, the base unit 102 may further include an input device, a display, a memory, and/or other elements. In one embodiment, the transmitter transmits a first number of downlink transmissions indicating a first slot for transmitting corresponding HARQ-ACK feedback and transmits a second number of downlink transmissions indicating a second slot for transmitting corresponding HARQ-ACK feedback. The processor determines a first downlink slot set for the HARQ-ACK feedback transmitted in the first slot and a second downlink slot set for the HARQ-ACK feedback transmitted in the second slot, and determines the first downlink slot set and the second downlink slot set have at least one overlapped slot. The receiver receives a first HARQ-ACK codebook in the first slot for the first downlink slot set and a second HARQ-ACK codebook in the second slot for the second downlink slot set. According to the present invention, HARQ-ACK feedback for each of the at least one overlapped slot is included in either the first HARQ-ACK codebook or the second HARQ-ACK codebook. The functions and implementations of all elements in the apparatus and definitions of related technical terms can refer to the specific descriptions of FIGS. 3-8 and the foregoing corresponding paragraphs in this specification.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

The invention claimed is:

1. An apparatus comprising:
a receiver that receives a first number of downlink transmissions indicating a first slot for transmitting corresponding hybrid automatic repeat request-acknowledgement feedback and receives a second number of downlink transmissions indicating a second slot for transmitting corresponding hybrid automatic repeat request-acknowledgement feedback;
a processor that determines a first downlink slot set for the hybrid automatic repeat request-acknowledgement feedback transmitted in the first slot and a second downlink slot set for the hybrid automatic repeat request-acknowledgement feedback transmitted in the second slot, and determines the first downlink slot set and the second downlink slot set have at least one overlapped slot;
a transmitter that transmits a first hybrid automatic repeat request-acknowledgement codebook in the first slot for the first downlink slot set and a second hybrid automatic repeat request-acknowledgement codebook in the second slot for the second downlink slot set, wherein hybrid automatic repeat request-acknowledgement feedback for each of the at least one overlapped slot is included in either the first hybrid automatic repeat request-acknowledgement codebook or the second hybrid automatic repeat request-acknowledgement codebook.

2. The apparatus of claim 1, wherein the processor determines that the first downlink slot set and the second downlink slot set have at least one overlapped slot in the condition that a slot offset between the first slot and the second slot is less than a size of a preconfigured hybrid automatic repeat request-acknowledgement feedback timing set.

3. The apparatus of claim 2, wherein the number of overlapped slots is equal to the size of the preconfigured hybrid automatic repeat request-acknowledgement feedback timing set minus the slot offset between the first slot and the second slot.

4. The apparatus of claim 3, wherein the overlapped slots are divided into a first portion and a second portion, and hybrid automatic repeat request-acknowledgement feedback for the first portion is included in the first hybrid automatic repeat request-acknowledgement codebook and hybrid automatic repeat request-acknowledgement feedback for the second portion is included in the second hybrid automatic repeat request-acknowledgement codebook.

5. The apparatus of claim 1, wherein the hybrid automatic repeat request-acknowledgement feedback for each of the at least one overlapped slot is included in either the first hybrid automatic repeat request-acknowledgement codebook or the second hybrid automatic repeat request-acknowledgement codebook according to an hybrid automatic repeat request-acknowledgement feedback timing indicated in associated DCI downlink control information.

6. The apparatus of claim 1, wherein the hybrid automatic repeat request-acknowledgement feedback for the at least one overlapped slot is included in the first hybrid automatic repeat request-acknowledgement codebook.

7. The apparatus of claim 1, wherein the hybrid automatic repeat request-acknowledgement feedback for the at least one overlapped slot is included in the second hybrid automatic repeat request-acknowledgement codebook.

8. An apparatus comprising:
a transmitter that transmits a first number of downlink transmissions indicating a first slot for transmitting corresponding hybrid automatic repeat request-acknowledgement feedback and transmits a second number of downlink transmissions indicating a second slot for transmitting corresponding hybrid automatic repeat request-acknowledgement feedback;
a processor that determines a first downlink slot set for the hybrid automatic repeat request-acknowledgement feedback transmitted in the first slot and a second downlink slot set for the hybrid automatic repeat request-acknowledgement feedback transmitted in the second slot, and determines the first downlink slot set and the second downlink slot set have at least one overlapped slot;
a receiver that receives a first hybrid automatic repeat request-acknowledgement codebook in the first slot for the first downlink slot set and a second hybrid automatic repeat request-acknowledgement codebook in the second slot for the second downlink slot set, wherein hybrid automatic repeat request-acknowledgement feedback for each of the at least one overlapped slot is included in either the first hybrid automatic repeat request-acknowledgement codebook or the second hybrid automatic repeat request-acknowledgement codebook.

9. The apparatus of claim 8, wherein the processor determines that the first downlink slot set and the second downlink slot set have at least one overlapped slot in the condition that a slot offset between the first slot and the second slot is less than a size of a preconfigured hybrid automatic repeat request-acknowledgement feedback timing set.

10. The apparatus of claim 9, wherein the number of overlapped slots is equal to the size of the preconfigured hybrid automatic repeat request-acknowledgement feedback timing set minus the slot offset between the first slot and the second slot.

11. The apparatus of claim 10, wherein the overlapped slots are divided into a first portion and a second portion, and hybrid automatic repeat request-acknowledgement feedback for the first portion is included in the first hybrid automatic repeat request-acknowledgement codebook and hybrid automatic repeat request-acknowledgement feedback for the second portion is included in the second hybrid automatic repeat request-acknowledgement codebook.

12. The apparatus of claim 8, wherein the hybrid automatic repeat request-acknowledgement feedback for each of the at least one overlapped slot is included in either the first hybrid automatic repeat request-acknowledgement codebook or the second hybrid automatic repeat request-acknowledgement codebook according to an hybrid automatic repeat request-acknowledgement feedback timing indicated in associated downlink control information.

13. The apparatus of claim 8, wherein the hybrid automatic repeat request-acknowledgement feedback for the at least one overlapped slot is included in the first hybrid automatic repeat request-acknowledgement codebook.

14. The apparatus of claim 8, wherein the hybrid automatic repeat request-acknowledgement feedback for the at least one overlapped slot is included in the second hybrid automatic repeat request-acknowledgement codebook.

15. A method comprising:
receiving a first number of downlink transmissions indicating a first slot for transmitting corresponding hybrid automatic repeat request-acknowledgement feedback and a second number of downlink transmissions indicating a second slot for transmitting corresponding hybrid automatic repeat request-acknowledgement feedback;
determining a first downlink slot set for the hybrid automatic repeat request-acknowledgement feedback transmitted in the first slot and a second downlink slot set for the hybrid automatic repeat request-acknowledgement feedback transmitted in the second slot;
determining the first downlink slot set and the second downlink slot set have at least one overlapped slot;
transmitting a first hybrid automatic repeat request-acknowledgement codebook in the first slot for the first downlink slot set and a second hybrid automatic repeat request-acknowledgement codebook in the second slot for the second downlink slot set, wherein hybrid automatic repeat request-acknowledgement feedback for each of the at least one overlapped slot is included in either the first hybrid automatic repeat request-acknowledgement codebook or the second hybrid automatic repeat request-acknowledgement codebook.

16. The method of claim 15, wherein the step of determining the first downlink slot set and the second downlink slot set have at least one overlapped slot comprises determining that there is at least one overlapped slot if a slot offset between the first slot and the second slot is less than a size of a preconfigured hybrid automatic repeat request-acknowledgement feedback timing set.

17. The method of claim 15, wherein the hybrid automatic repeat request-acknowledgement feedback for each of the at least one overlapped slot is included in either the first hybrid automatic repeat request-acknowledgement codebook or the second hybrid automatic repeat request-acknowledgement codebook according to an hybrid automatic repeat request-acknowledgement feedback timing indicated in associated downlink control information.

18. A method comprising:
transmitting a first number of downlink transmissions indicating a first slot for transmitting corresponding hybrid automatic repeat request-acknowledgement feedback and transmits a second number of downlink transmissions indicating a second slot for transmitting corresponding hybrid automatic repeat request-acknowledgement feedback;
determines a first downlink slot set for the hybrid automatic repeat request-acknowledgement feedback transmitted in the first slot and a second downlink slot set for the hybrid automatic repeat request-acknowledgement feedback transmitted in the second slot;
determining the first downlink slot set and the second downlink slot set have at least one overlapped slot;

receiving a first hybrid automatic repeat request-acknowledgement codebook in the first slot for the first downlink slot set and a second hybrid automatic repeat request-acknowledgement codebook in the second slot for the second downlink slot set, wherein hybrid automatic repeat request-acknowledgement feedback for each of the at least one overlapped slot is included in either the first hybrid automatic repeat request-acknowledgement codebook or the second hybrid automatic repeat request-acknowledgement codebook.

19. The method of claim 18, wherein the step of determining the first downlink slot set and the second downlink slot set have at least one overlapped slot comprises determining that there is at least one overlapped slot if a slot offset between the first slot and the second slot is less than a size of a preconfigured hybrid automatic repeat request-acknowledgement feedback timing set.

20. The method of claim 18, wherein the hybrid automatic repeat request-acknowledgement feedback for each of the at least one overlapped slot is included in either the first hybrid automatic repeat request-acknowledgement codebook or the second hybrid automatic repeat request-acknowledgement codebook according to an hybrid automatic repeat request-acknowledgement feedback timing indicated in associated downlink control information.

* * * * *